US009569486B2

(12) United States Patent
Gupta et al.

(10) Patent No.: US 9,569,486 B2
(45) Date of Patent: Feb. 14, 2017

(54) SYSTEM AND A METHOD FOR HIERARCHICAL DATA COLUMN STORAGE AND EFFICIENT QUERY PROCESSING

(71) Applicant: International Business Machines Corporation, Armonk, NY (US)

(72) Inventors: Himanshu Gupta, New Delhi (IN); Rajeev Gupta, New Delhi (IN); Sanjeev Kumar Gupta, Los Altos, CA (US); Sriram K. Padmanabhan, San Jose, CA (US); Sriram Raghavan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 14/039,602

(22) Filed: Sep. 27, 2013

(65) Prior Publication Data
US 2015/0095341 A1   Apr. 2, 2015

(51) Int. Cl.
G06F 17/30 (2006.01)
(52) U.S. Cl.
CPC .............................. *G06F 17/30424* (2013.01)
(58) Field of Classification Search
CPC ............ G06F 17/30017; G06F 17/30227; G06F 17/30286; G06F 17/30589; G06F 17/30619; G06F 17/3074; G06F 17/30424
USPC ....................................................... 707/741
See application file for complete search history.

(56) References Cited

U.S. PATENT DOCUMENTS

| 6,480,857 B1* | 11/2002 | Chandler ...................... 707/792 |
| 6,986,102 B1* | 1/2006 | Baer et al. .................... 715/206 |
| 7,756,889 B2* | 7/2010 | Yu et al. ........................ 707/774 |
| 8,447,755 B1* | 5/2013 | Melbourne et al. .......... 707/715 |
| 2007/0250762 A1* | 10/2007 | Mansfield .................. 715/501.1 |
| 2011/0060718 A1* | 3/2011 | You et al. ...................... 707/600 |
| 2012/0016901 A1* | 1/2012 | Agarwal et al. .............. 707/769 |
| 2012/0311589 A1* | 12/2012 | Agarwal et al. .............. 718/102 |
| 2013/0124467 A1* | 5/2013 | Naidu et al. .................. 707/610 |
| 2013/0198237 A1* | 8/2013 | Serban et al. ................. 707/792 |
| 2013/0262522 A1* | 10/2013 | van Rotterdam et al. .... 707/802 |
| 2014/0136511 A1* | 5/2014 | Hughes et al. ............... 707/714 |

OTHER PUBLICATIONS

Asiki, Athanasia et al., "An Adaptive Online System for Efficient Processing of Hierarchical Data," HHPDC'09, Munich, Germany, Jun. 11-13, 2009, 10 pages, ACM Digital Library.

(Continued)

*Primary Examiner* — Hosain Alam
*Assistant Examiner* — Saba Ahmed
(74) *Attorney, Agent, or Firm* — Ference & Associates LLC

(57) ABSTRACT

An embodiment provides intermediate data derived in the form of column stores which are in turn based on hierarchical data stores. This intermediate data represents a reduced subset of data matched appropriately to a query (or modified query) such that the amount of data handled in a query processing task on large data is greatly reduced. An embodiment may appropriately choose column data stores and/or modify queries in order leverage parallelization techniques such as map-reduce in order to query large data. The result is the ability to query large data stores in parallel while reducing the amount of data that must be handled.

18 Claims, 5 Drawing Sheets

(56) References Cited

OTHER PUBLICATIONS

Ding, Z. et al., "Performing MapReduce on Data Centers with Hierarchical Structures," International Journal of Computers, Communications & Control, Sep. 2012, pp. 432-449, vol. 7, No. 3, Agora University Editing House-CCC Publications, Romania.

Huntley, Stephen, A Novel Method for Representing Hierarchies in a Relational Database Using Bignums and SQLite, 2011, 10 pages. found at http://webcache.googleusercontent.com/search?q=cache:T031yZqFe7sJ:www.tclcommunityassociation.org/wub/proceedings/Proceedings-2011/StephenHuntley/Huntley_Tcl2011.pdf+&cd=1&hl=en&ct=clnk&gl=us accessed Sep. 26, 2013.

Floratou, Avrilia et al., "Column-Oriented Storage Techniques for MapReduce," The 37th International Conference on Very Large Data Bases, Proceedings of the VLDB Endowment, Seattle, Washington, USA, Aug. 29-Sep. 3, 2011, pp. 419-429, vol. 4, No. 7, VLDB Endowment, Inc., hosted by IBM Almaden Research Center, California, USA.

Lin, Yuting et al., "Llama: Leveraging Columnar Storage for Scalable Join Processing in the MapReduce Framework," SIGMOD'11, Athens, Greece, Jun. 12-16, 2011, 12 pages, ACM Digital Library.

Kaldewey, Tim et al., "Clydesdale: Structured Data Processing on MapReduce," EDBT 2012, Berlin, Germany, Mar. 26-30, 2012, 11 pages, ACM Digital Library.

\* cited by examiner

SYSTEM AND A METHOD FOR HIERARCHICAL DATA COLUMN STORAGE AND EFFICIENT QUERY PROCESSING

BACKGROUND

Serial data processing (herein "query processing") is often utilized to handle large amounts of data. The map-reduce framework has become a popular way of parallelizing large scale data queries and has found use in a wide variety of scenarios. HADOOP software is an implementation of the map-reduce framework that manages communication across various computing nodes and the HADOOP distributed file system (HDFS) is utilized in this context by HADOOP applications. In the HDFS, disk space is shared across computing nodes/machines in a cluster, with a data file being distributed among machines of the cluster. (HADOOP is a registered trademark of The Apache Software Foundation in the United States and/or other countries.)

BRIEF SUMMARY

In summary, one aspect of the invention provides a method for data storage and searching, comprising: utilizing at least one processor to execute computer code configured to perform the steps of: creating column data based on a store of hierarchical data; said creating comprising pre-processing the hierarchical data such that values of a column with respect to different rows are stored together; accepting a data query with respect to the column data; deriving hierarchy information from the store of hierarchical data; using the column data and hierarchy information to create intermediate data; generating a modified query based on the data query and on an input data schema; and executing the modified query using the intermediate data.

Another aspect of the invention provides a computer program product for data storage and searching, said computer program product comprising: a computer readable storage medium having computer readable program code embodied therewith, the computer readable program code comprising: computer readable program code configured to create column data based on a store of hierarchical data, via pre-processing the hierarchical data such that values of a column with respect to different rows are stored together; computer readable program code configured to accept a data query with respect to the column data; computer readable program code configured to derive hierarchy information from the store of hierarchical data; computer readable program code configured to use the column data and hierarchy information to create intermediate data; computer readable program code configured to generate a modified query based on the data query and on an input data schema; and computer readable program code configured to execute the modified query using the intermediate data.

A further aspect of the invention provides an apparatus for data storage and searching, said apparatus comprising: at least one processor; and a computer readable storage medium having computer readable program code embodied therewith and executable by the at least one processor, the computer readable program code comprising: computer readable program code configured to create column data based on a store of hierarchical data, via pre-processing the hierarchical data such that values of a column with respect to different rows are stored together; computer readable program code configured to accept a data query with respect to the column data; computer readable program code configured to derive hierarchy information from the store of hierarchical data; computer readable program code configured to use the column data and hierarchy information to create intermediate data; computer readable program code configured to generate a modified query based on the data query and on an input data schema; and computer readable program code configured to execute the modified query using the intermediate data.

An additional aspect of the invention provides a method comprising: storing hierarchical data in a column storage; creating intermediate data from the hierarchical data; compiling a query using a data schema to generate a modified query for the intermediate data; and executing the modified query over the intermediate data; said storing comprising: storing each of a plurality of attributes in separate columns; and storing with each attribute at least one of: a node identification, a value, a parent identification and a record identification.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
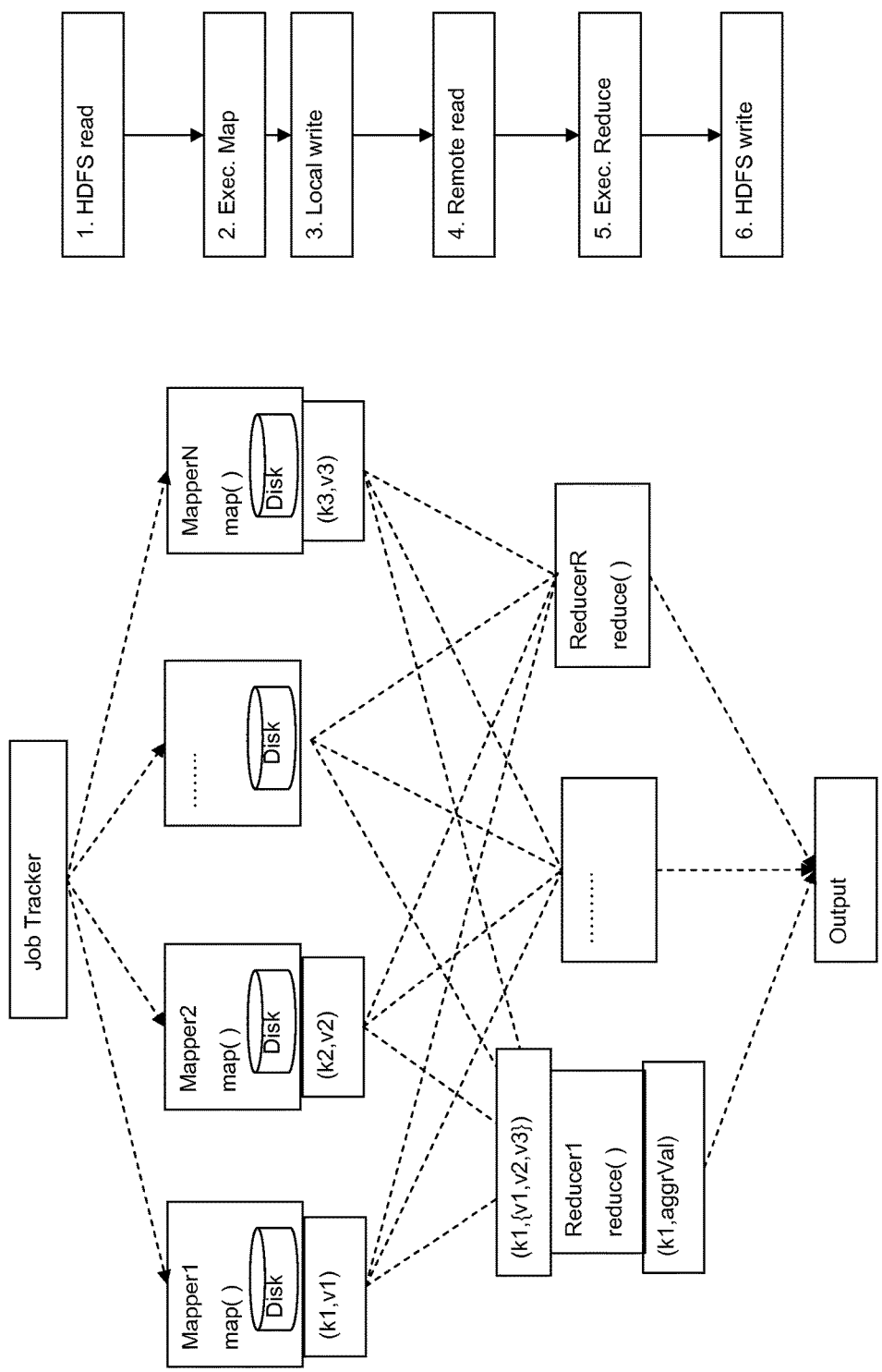
FIG. 1 illustrates an example parallelized query processing framework and associated steps.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12 in FIG. 5. In accordance with an example embodiment, most if not all of the process steps, components and outputs discussed with respect to FIGS. 1-5 can be performed or utilized by way of a processing unit or units and system memory such as those indicated, respectively, at 16 and 28 in FIG. 5, whether on a server computer, a client computer, a node computer in a distributed network, or any combination thereof.

FIG. 1 illustrates an example map-reduce framework or operating environment including a plurality of computing nodes (herein also referred to as simply "nodes"). In this context, a large amount of data is distributed among nodes (e.g., stored on disks) and jobs are split into mapping tasks, executed by mapper nodes 1 through "N". The mapper nodes produce key-value pairs. Reduce tasks, which are executed by reduce nodes, e.g., reducer nodes 1 through "R", process the intermediate data produced by mappers and carry out the required analytics, e.g., aggregation.

For example, as outlined in steps 1-6 of FIG. 1, a job (managed by a job tracker) initiates an HDFS read (step 1) and map tasks execute (in parallel, step 2). Each mapper node searches an attribute of interest, e.g., book publisher, and identifies records stored in a hierarchical fashion containing this attribute and an associated value (e.g., count value). A local write occurs (step 3) for each mapper node as output, i.e., writing the key-value pairs found via searching the hierarchical records. A remote read occurs (step 4) for each reducer node, accessing key-value pairs that may be processed (reduce tasks executed in parallel, step 5). This accessing may be performed via aggregating the attribute values derived from the map nodes. Further, the accessing may be performed to answer a data query, e.g., average rating of titles by a particular book publisher contained in the data store. The query answer may then be output via HDFS write (step 6).

As illustrated in FIG. 1 an advantage of such a map reduce framework is the ability to parallelize tasks, i.e., running many mapper nodes (to obtain key-value pairs) and many reduce nodes (to reduce, e.g., aggregate, values keyed to an attribute of interest) in parallel. This allows the querying of large amounts of data in a reduced time. However, there are some issues remaining in handling such a large amount of data.

For example, as illustrated in FIG. 1, disk I/O cost is high, e.g., reading/parsing (on HDFS read, step 1) and/or processing a large amount of data (e.g., locally writing key value pairs, step 3) is required and writing data to a distributed file system (e.g., HDFS write, step 6) requires many I/O communications to take place. Another cost is communication, e.g., communication of key-value pairs among the cluster of nodes (e.g., remote read, step 4), shuffle/sort costs, etc., mount quickly as characteristically many communications are generated when preparing reducer tasks in a query of a large data store. Furthermore, the processing cost is quite high (e.g., executing map and reduce tasks, steps 2 and 5) in as much as the computations carried out to generate the key-value pairs by the map tasks and the computations carried out by reducer nodes to generate output (query output) are process-intensive.

Figure 2:
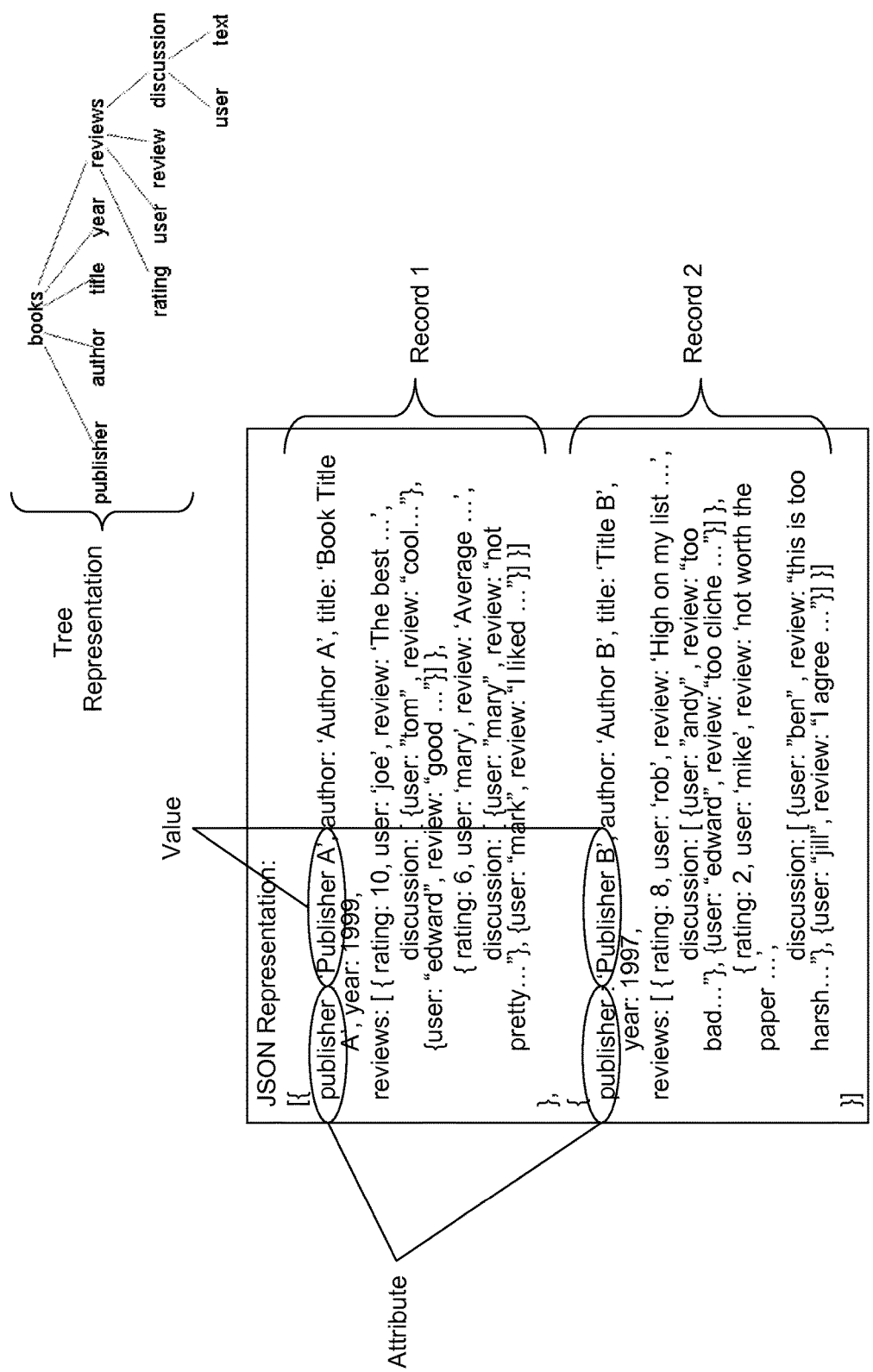
FIG. 2 illustrates example hierarchical data records.

A contributor to these costs is the hierarchical nature of the data being searched. Many applications utilize a hierarchical data store that is queried in such parallelized applications, e.g., map-reduce queries. Illustrated in FIG. 2 is an example hierarchical data store containing two hierarchical records. The hierarchical records contain attributes at different nested levels, e.g., have a nested structure. Attributes themselves may be basic types, hierarchical, or arrays (or array of records). A hierarchical record is "bulkier" than a flat record, which means it may contain many nested attributes therein—some of which may be irrelevant for answering a particular query.

Nonetheless, many queries involve only a few attributes at various nested levels in the hierarchical record. Given such a query, unfortunately, in conventional arrangements the entire hierarchical record is fetched, parsed and processed, even though a select few attributes are of interest.

For example, in both the Java™ Script Object Notation (JSON) representation of the records and in the tree representation thereof (referring to FIG. 2), it can be appreciated that the records contain information organized as books, publisher, author, title, year, reviews, rating, user, review, discussion, user and text. Here, as may be appreciated from the tree representation, publisher, author, title, year and reviews are nested under the parent node book, whereas rating, user, review and discussion are nested within reviews, and likewise user and text are nested within discussion.

Therefore, in a query such as "project author, title and average rating for a particular publisher", e.g., "Publisher A", the entire record is not necessary, only the information found in the attributes "author", "title", "publisher" and "rating". Thus, fetching and processing the entire record information to answer such a query is wasteful, as described herein in terms of communication costs, processing tasks, etc. Thus, even if the job is executed using a parallelization scheme, e.g., map reduce, large disk I/O costs and map processing costs will be incurred because of the handling of useless data (in terms of the particular query at hand).

Moreover, if the record is communicated, and the record is large, a correspondingly large communication cost will be realized.

Accordingly, an embodiment reduces these costs by intelligently organizing hierarchical data such that only data relevant to a particular query is handled (fetched, processed, communicated, etc.). This permits a more targeted handling of queries in terms of the underlying data fetched, processed, and communicated.

Figure 3:
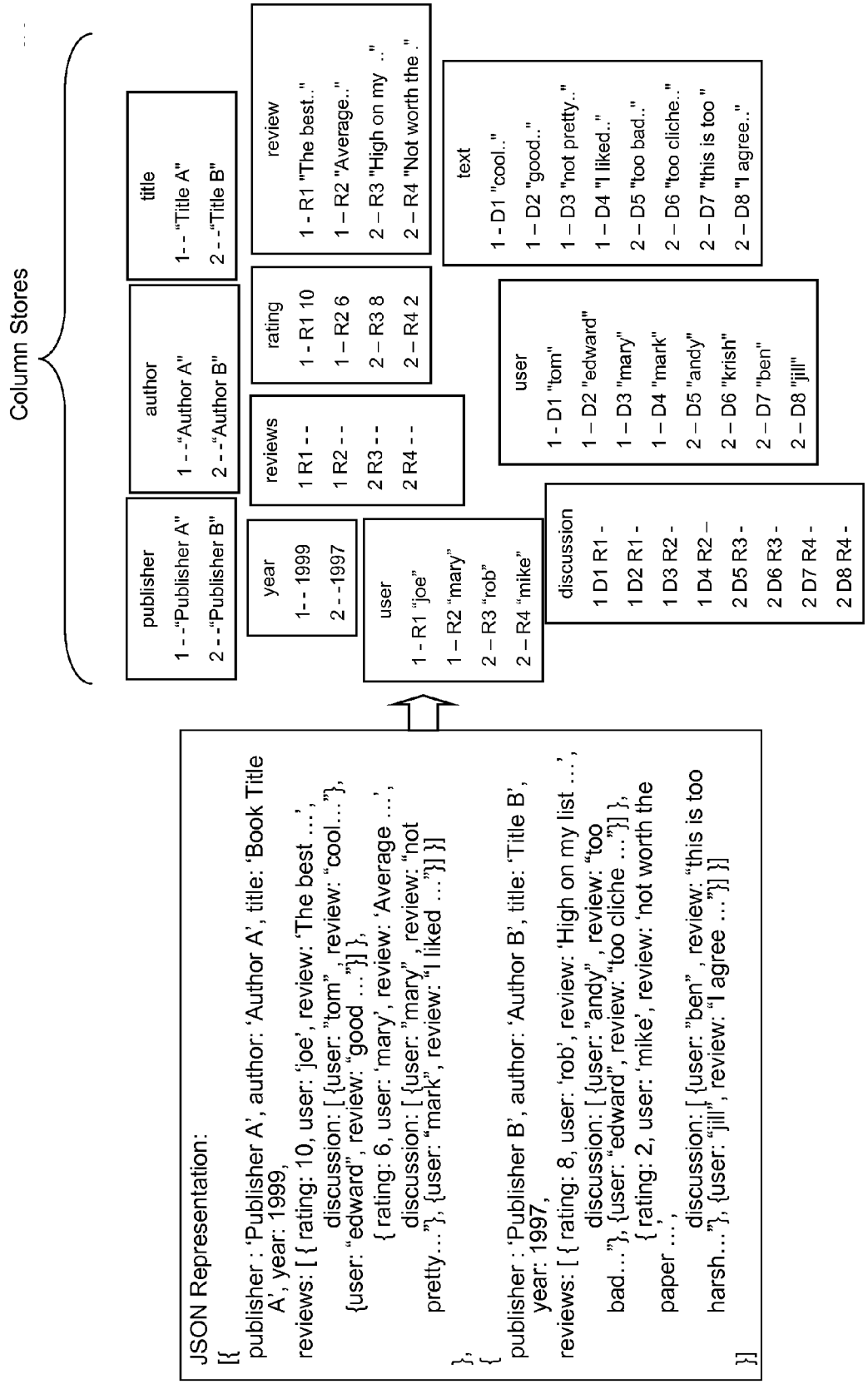
FIG. 3 illustrates example hierarchical data records and associated column stores.

In an embodiment, the hierarchical data records are stored as column data structures or column stores, e.g., tables or files. The column stores may include an attribute-value pairing stored in separate files or tables. For each attribute-value pairing, the following information may be stored: a record identification (e.g., "1" or "2", for the two records in the example of FIGS. 2-3), a node identification (for non-leaf nodes), for example "R1" for review "1", "R2" for review "2", etc., a node identification of the parent in the schema tree, e.g., "R1", "D2", etc., and an attribute value, e.g., "1999" for "year" attribute. Certain entries in the column stores are optional, e.g., node identification and node identification of the parent. Thus, each column store contains at least an attribute and a value in column form. Examples of column stores for the records 1 and 2 of the JSON representation of the records are illustrated in FIG. 3.

Each attribute of a record is stored as a column store in a separate column data structure, e.g., table or file. In one approach the complete path (e.g., referring to the tree representation of the record) of a hierarchical record may be stored; however, in some cases this will not be necessary. With each attribute-value pair, the record identification and the parent identification may be stored. For example, in FIG. 3, in the column data store for "discussion" the following information is stored in a first row: "1, D1, R1". This information includes both a parent identification, e.g., "R1" for "review one", the parent node from which the discussion value was derived, and "1" indicating it has been derived from the first record. This information may be derived from the hierarchical record or data store (a data schema).

This column store of data may be used advantageously to reduce costs of processing queries in large data stores. For example, an embodiment utilizes the column data stores such that, rather than running a query on an entire hierarchical record of data, only the files corresponding to or relevant to the query are processed. To accomplish this, an embodiment may generate or create intermediate data, which represent data containing the required attributes to answer the query in question. For example, in an embodiment, the column data stores (e.g., tables) that correspond to the attributes relevant to the query may be joined. Thus, an embodiment may execute the required query/analysis on the intermediate data (containing the relevant data) rather than the entire record contents in order to produce query results. This results in the handling (fetching, communicating, writing, processing) of a smaller amount of data.

Figure 4:
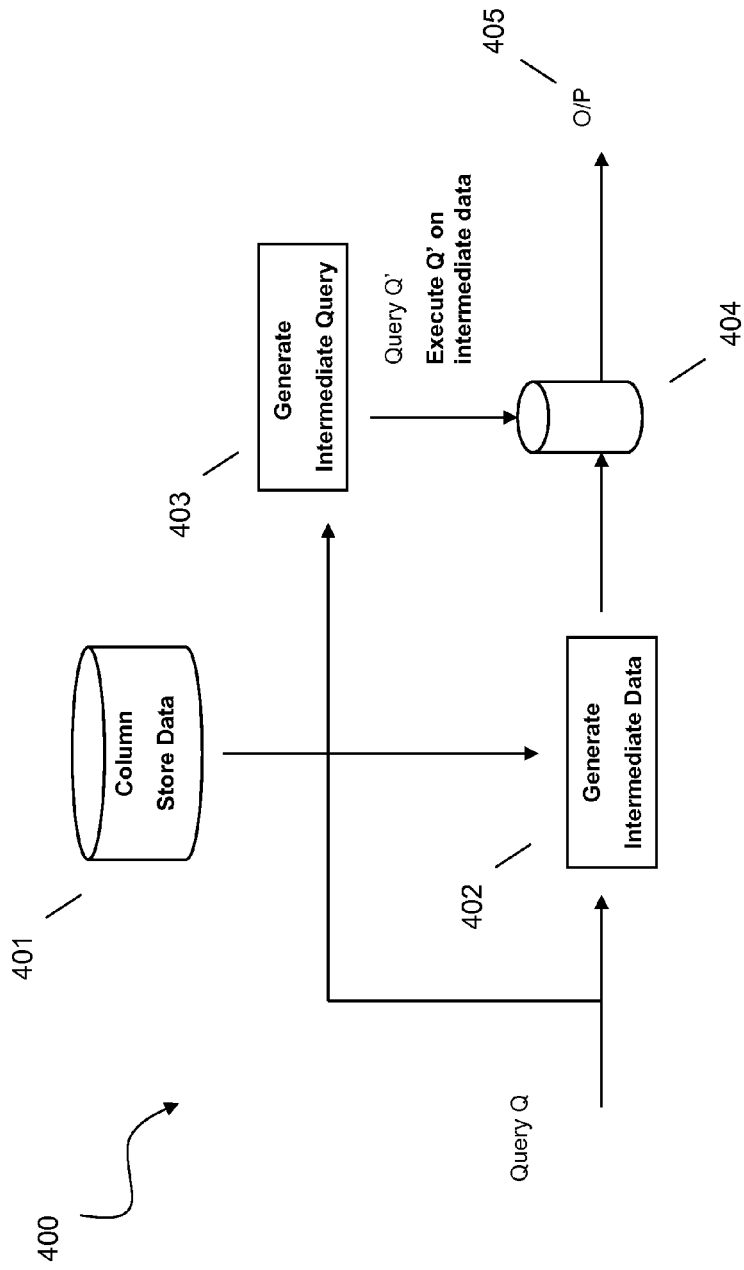
FIG. 4 illustrates an example architecture for hierarchical data column storage and efficient query processing.

As illustrated in FIG. 4, a framework 400 for handling this more efficient query processing is illustrated. In an input or initial query "Q", attributes are indicated. Using these attributes, an embodiment may generate intermediate data 402 from column stores 401. That is, the relevant data of the tables matching the attributes may be fetched and processed to generate the intermediate data 402.

Intermediate data are generated as follows. Each row/line in a table (column store table) is parsed and a key-value pair is generated. The key is the record-ID and the value is the rest of the information in the row. This mechanism ensures that all the key-value pairs generated for a record in the original hierarchical data contained the identical key, i.e., record-ID. As HADOOP groups together all the pairs with an identical key, all the pairs sharing the same identical key are routed to the same reducer. This reducer can hence construct the intermediate data 402.

An embodiment may then execute a query on the intermediate data using a parallelized system 404, e.g., according to a map-reduce process. This will provide output 405 to the query much the same way as normal parallelization would, e.g., using map-reduce tasks to answer the query. An embodiment thus allows for processing a subset of data, represented by the intermediate data generated at 402, which has been intelligently chosen on the basis of the attributes relevant to query Q. Thus, only the necessary data are handled in executing the query.

It will be noted that in an embodiment, the query may be changed. For example, as shown in FIG. 4, an intermediate query "Q'" is generated 403. This may be accomplished on the basis of leveraging hierarchical information derived from the hierarchical data records.

For example, in a query on attributes "author", "title", "rating" and "publisher" on records 1 and 2 (referring to FIG. 2 and FIG. 3), based on the hierarchical structure of the data (and consequent resulting column stores), to answer this query the attribute "reviews" is added. This is because "reviews", referring to the tree representation of FIG. 2, links the attributes "author", "title" and "publisher" (nested under "books") with "rating", which is part of the query. Thus, "reviews" column store data should be included in the intermediate data to answer the query. Thus, an embodiment may change query "Q" to intermediate query "Q'" in order to process the query on the intermediate data at 404.

The intermediate data generated at 402 may be written to a temporary file. For a query Q regarding project author, title, and average rating for Publisher B (of the example records illustrated in FIGS. 2-3), "author", "title", "rating", "publisher" and "reviews" are read from column store data to create intermediate data. A compiler may be used to modify the query input, as described herein. Thus for example, instead of executing the input query (e.g., query Q) on the existing data, an embodiment executes a modified query Q' prime. As a specific example, for the input query Q:

"books→filter $.publisher=='Publisher B'→transform
{author:$.author,title: $.title, avgRating: avg($[*].rating)} may be modified to query Q':
intermediate_books→filter
$.publisher==='O'Reilly'→transform
{author:$.author, title:$.title, avgRating:avg($.rating array)}

For each review, get the number of comments made:
books→expand $.reviews→transform {review:$.review, numComments: count($.discussion)}
reviews→transform {review:$.review, numComments: count($.discussion)}

Accordingly, it can be appreciated from the foregoing that an embodiment provides intermediate data derived from column stores which are in turn based on hierarchical data stores. These intermediate data represent a reduced subset of data matched appropriately to a query (or modified query) such that the amount of data handled in a query processing task is greatly reduced. It will in turn be appreciated that by preserving the hierarchical information in the column data stores and leveraging the hierarchical information of the underlying records, an embodiment may appropriately choose column data stores and/or modify queries in order to continue leveraging parallelization techniques such as mapreduce in order to query large data. The result is the ability to query large data stores in parallel while reducing the amount of data that must be handled.

An embodiment reduces the amount of data (e.g., number of files) handled because of their organization in column form. For example, the entire file "reviews" in the example above need not be read to answer the example query Q because only the information in "rating" is of interest. Thus, data of "user", "review", "discussion", "user" and "text" may be omitted (referring to the tree representation of FIG. 2). It will also be appreciated that other techniques may be utilized by an embodiment to further reduce the amount of data, e.g., by compressing the column stored data and/or writing multiple data values in a single row of the column store, which makes storage and reading of data more efficient.

Figure 5:
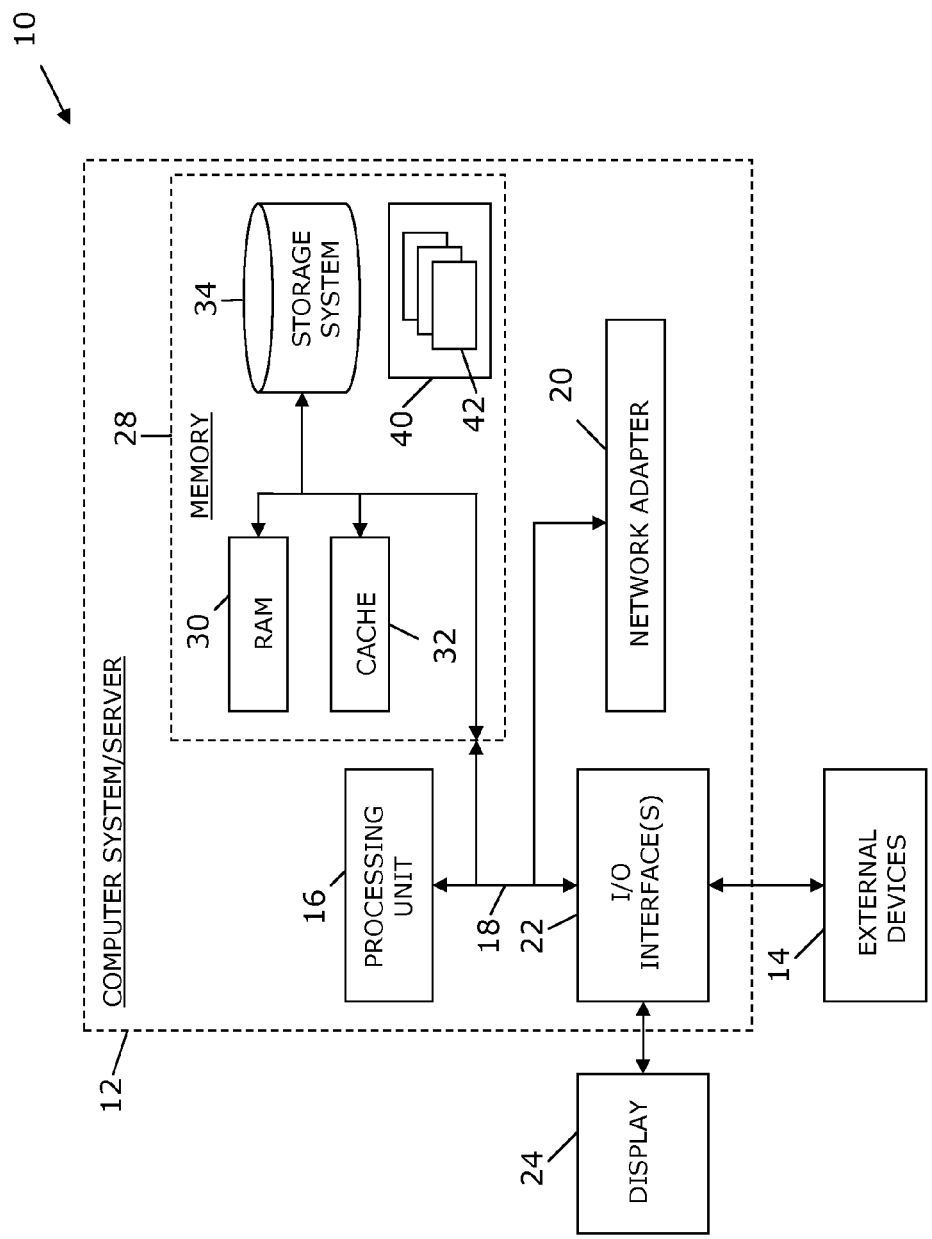
FIG. 5 illustrates an example computing node.

Referring now to FIG. 5, a schematic of an example of a computing node is shown. Computing node 10 is only one example of a suitable cloud computing node and is not intended to suggest any limitation as to the scope of use or functionality of embodiments of the invention described herein. Regardless, computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, at least one processor or processing unit 16, a system memory 28, and a bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that are accessible by computer system/server 12, and include both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 (by way of example, and not limitation), as well as an operating system, at least one application program, other program modules, and program data. Each of the operating systems, at least one application program, other program modules, and program data or some combination thereof, may include an implementation of a networking environment. Program modules 42 generally carry out the functions and/or methodologies of embodiments of the invention as described herein.

Computer system/server 12 may also communicate with at least one external device 14 such as a keyboard, a pointing device, a display 24, etc.; at least one device that enables a user to interact with computer system/server 12; and/or any devices (e.g., network card, modem, etc.) that enable computer system/server 12 to communicate with at least one other computing device. Such communication can occur via I/O interfaces 22. Still yet, computer system/server 12 can communicate with at least one network such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method for data storage and searching, comprising:
   utilizing at least one processor to execute computer code configured to perform the steps of:
   creating column data based on a store of hierarchical data;
   said creating comprising pre-processing the hierarchical data such that values of a column with respect to different rows are stored together;
   accepting a data query with respect to the column data;
   deriving hierarchy information from the store of hierarchical data;
   generating key-value pairs based on each row of the column data;
   the key-value pairs being stored, via map-reduce, in a reducer with similar key-value pairs to create intermediate data;
   generating a modified query based on the data query and on an input data schema; and
   executing the modified query using the intermediate data;
   the hierarchical data comprising data organized as a plurality of tree-structures;
   at least one of the tree-structures including one or more data attributes not relevant to the data query;
   wherein the intermediate data do not include the at least one tree-structure having one or more data attributes not relevant to the data query.

2. The method of claim 1, wherein said generating a modified query comprises changing the data query based on a data schema derived from the store of hierarchical data and a data schema of the intermediate data.

3. The method of claim 1, wherein said executing comprises executing the modified query using a parallelized, distributed architecture.

4. The method of claim 1, wherein the column data comprise data of the hierarchical data store organized into column-based data structures.

5. The method of claim 4, wherein each of the column-based data structures comprises a plurality of record values and an attribute value associated with the plurality of record values.

6. The method of claim 5, wherein each of the record values corresponds to hierarchical record data associated with the attribute value.

7. The method of claim 6, wherein the intermediate data are created utilizing links between stores of the column data.

8. The method of claim 7, wherein the links are derived from schemata of the store of hierarchical data.

9. A computer program product for data storage and searching, said computer program product comprising:
  a non-transitory computer readable storage medium having computer readable program code embodied therewith, the computer readable program code comprising:
  computer readable program code configured to create column data based on a store of hierarchical data, via pre-processing the hierarchical data such that values of a column with respect to different rows are stored together;
  computer readable program code configured to accept a data query with respect to the column data;
  computer readable program code configured to derive hierarchy information from the store of hierarchical data;
  computer readable program code configured to generate key-value pairs based on each row of the column data;
  the key-value pairs being stored, via map-reduce, in a reducer with similar key-value pairs to create intermediate data;
  computer readable program code configured to generate a modified query based on the data query and on an input data schema; and
  computer readable program code configured to execute the modified query using the intermediate data;
  the hierarchical data comprising data organized as a plurality of tree-structures;
  at least one of the tree-structures including one or more data attributes not relevant to the data query;
  wherein the intermediate data do not include the at least one tree-structure having one or more data attributes not relevant to the data query.

10. The computer program product of claim 9, wherein a modified query is generated by changing the data query based on a data schema derived from the store of hierarchical data and a data schema of the intermediate data.

11. The computer program product of claim 9, wherein the modified query is executed by executing a data query using a parallelized, distributed architecture.

12. The computer program product of claim 9, wherein the column data comprise data of the hierarchical data store organized into column-based data structures.

13. The computer program product of claim 12, wherein each of the column-based data structures comprises a plurality of record values and an attribute value associated with the plurality of record values.

14. The computer program product of claim 13, wherein each of the record values corresponds to hierarchical record data associated with the attribute value.

15. The computer program product of claim 14, wherein the intermediate data are created utilizing links between stores of the column data.

16. The computer program product of claim 15, wherein the links are derived from schema of the store of hierarchical data.

17. An apparatus for data storage and searching, said apparatus comprising:
  at least one processor; and
  a non-transitory computer readable storage medium having computer readable program code embodied therewith and executable by the at least one processor, the computer readable program code comprising:
  computer readable program code configured to create column data based on a store of hierarchical data, via pre-processing the hierarchical data such that values of a column with respect to different rows are stored together;
  computer readable program code configured to accept a data query with respect to the column data;
  computer readable program code configured to derive hierarchy information from the store of hierarchical data;
  computer readable program code configured to generate key-value pairs based on each row of the column data;
  the key-value pairs being stored, via map-reduce, in a reducer with similar key-value pairs to create intermediate data;
  computer readable program code configured to generate a modified query based on the data query and on an input data schema; and
  computer readable program code configured to execute the modified query using the intermediate data;
  the hierarchical data comprising data organized as a plurality of tree-structures;
  at least one of the tree-structures including one or more data attributes not relevant to the data query;
  wherein the intermediate data do not include the at least one tree-structure having one or more data attributes not relevant to the data query.

18. A method comprising:
  storing hierarchical data in a column storage;
  generating key-value pairs based on each row of the column storage;
  the key-value pairs being stored, via map-reduce, in a reducer with similar key-value pairs to create intermediate data;
  compiling a query using a data schema to generate a modified query for the intermediate data; and
  executing the modified query over the intermediate data;
  said storing comprising:
  storing each of a plurality of data attributes in separate columns; and
  storing with each attribute at least one of: a node identification, a value, a parent identification and a record identification;
  the hierarchical data comprising data organized as a plurality of tree-structures;
  at least one of the tree-structures including one or more data attributes not relevant to the data query;
  wherein the intermediate data do not include the at least one tree-structure having one or more data attributes not relevant to the data query.

* * * * *